United States Patent
Matter

(12) 
(10) Patent No.: US 10,998,990 B2
(45) Date of Patent: May 4, 2021

(54) SYSTEM AND METHOD FOR TRANSMITTING RADIO STATIONS ON CABLE NETWORKS WITH INCREASED DATA TRAFFIC IN THE VHF RANGE

(71) Applicant: Sumatronic AG, Unterageri (CH)

(72) Inventor: Peter Matter, Unterageri (CH)

(73) Assignee: Sumatronic AG, Unterageri (CH)

( * ) Notice: Subject to any disclaimer, the term of this patent is extended or adjusted under 35 U.S.C. 154(b) by 258 days.

(21) Appl. No.: 16/305,590

(22) PCT Filed: May 15, 2017

(86) PCT No.: PCT/CH2017/000043
§ 371 (c)(1),
(2) Date: Nov. 29, 2018

(87) PCT Pub. No.: WO2017/205989
PCT Pub. Date: Dec. 7, 2017

(65) Prior Publication Data
US 2020/0366394 A1      Nov. 19, 2020

(30) Foreign Application Priority Data

May 31, 2016   (EP) .................................... 16172163

(51) Int. Cl.
*H04H 20/79* (2008.01)
*H04B 3/02* (2006.01)

(52) U.S. Cl.
CPC .............. *H04H 20/79* (2013.01); *H04B 3/02* (2013.01)

(58) Field of Classification Search
CPC ........... H04H 20/79; H04H 20/78; H04B 3/02
See application file for complete search history.

(56) References Cited

U.S. PATENT DOCUMENTS 2,854,506 A    9/1958  Pickles
3,619,782 A    11/1971  Stokes
(Continued)

FOREIGN PATENT DOCUMENTS

EP    2 523 371 A2    11/2012

OTHER PUBLICATIONS

International Search Report for PCT/CH2017/000043 dated Aug. 17, 2017 [PCT/ISA/210].

*Primary Examiner* — Kenneth T Lam
(74) *Attorney, Agent, or Firm* — Sughrue Mion, PLLC

(57) ABSTRACT

The invention relates to a system and a method for continuing the transmission from radio transmitters to cable networks with the simultaneous increase of internet data transmission in the VHF range. According to the invention, the radio signals, destined for radio receivers connected to the cable network, and having an original frequency in the VHF range between 30 MHz and 280 MHz, in particular in the range of VHF-band II between 65.9 MHZ and 108 MHz or VHF-band III between 174 MHz and 230/240 MHz, are to be transferred into another free frequency range of the cable network by means of a frequency band transfer device (100), are to be transmitted to the cable network in this frequency range, and directly before the radio receiver, are to be transferred back into the original frequency or into another frequency that can be received by the radio device in the VHF range by means of a frequency band back-transfer device (200).

17 Claims, 2 Drawing Sheets

(56) References Cited

U.S. PATENT DOCUMENTS

Figure 1:
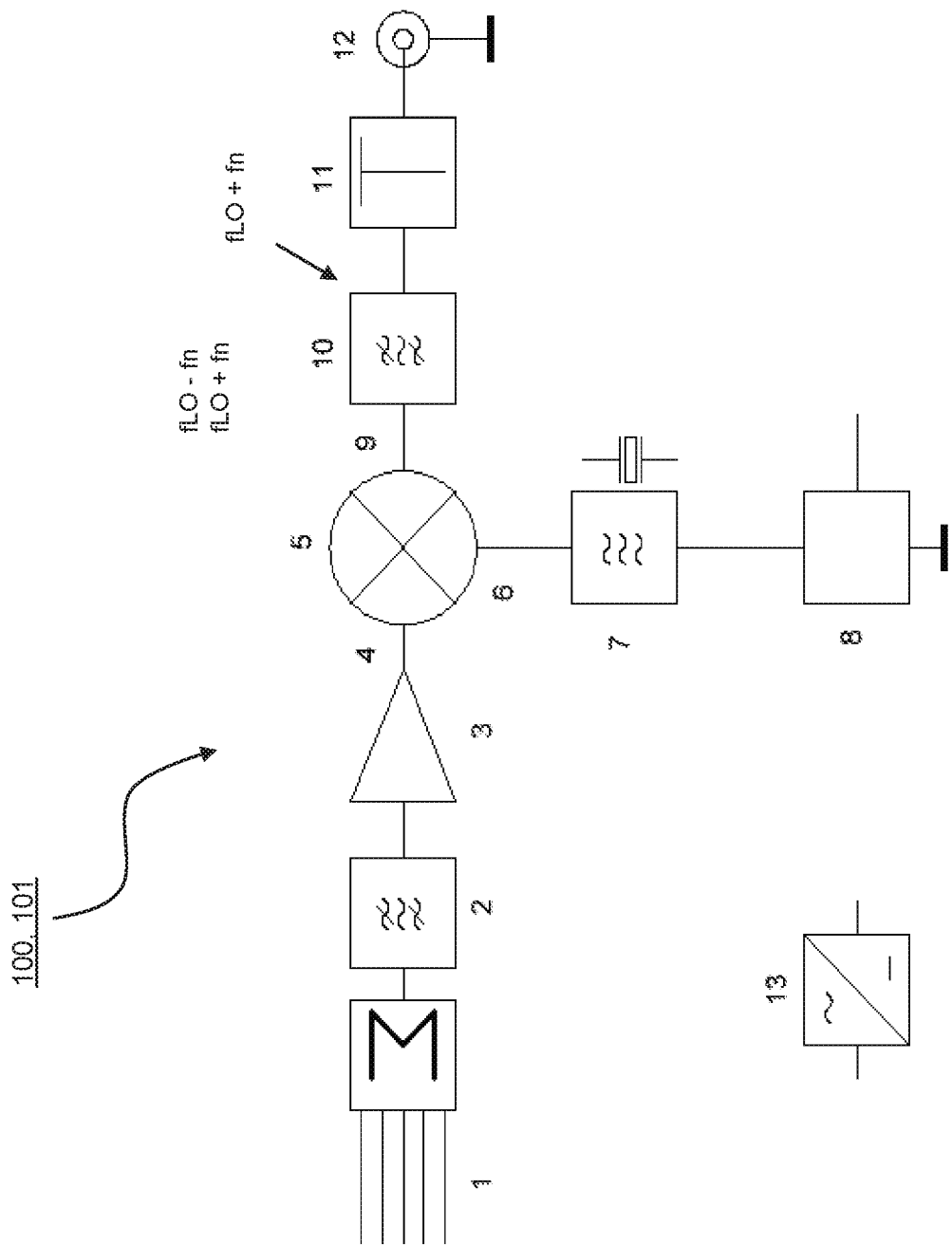

| | | | |
|---|---|---|---|
| 5,548,323 A * | 8/1996 | Callahan | H04H 20/79 |
| | | | 348/460 |
| 2005/0243902 A1 * | 11/2005 | Robert | H03D 7/163 |
| | | | 375/214 |
| 2007/0242775 A1 * | 10/2007 | Cheng | H04L 27/20 |
| | | | 375/308 |

* cited by examiner

SYSTEM AND METHOD FOR TRANSMITTING RADIO STATIONS ON CABLE NETWORKS WITH INCREASED DATA TRAFFIC IN THE VHF RANGE

CROSS REFERENCE TO RELATED APPLICATIONS

This application is a National Stage of International Application No. PCT/CH2017/000043, filed on May 15, 2017, which claims priority from European Patent Application No. 16172163.4, filed on May 31, 2016.

The invention relates to a system and a method for continuing the transmission of broadcast stations on cable networks with the simultaneous expansion of internet data transmission in the VHF (very high frequency) range.

Today, radio programs are also transmitted in many countries on cable networks (CATV, cable TV networks) in addition to TV programs and internet data. These radio programs are usually transmitted on USW (ultrashort wave) and also occasionally on DAB (digital audio broadcasting)/DAB+ (digital audio broadcasting +) or DMB (digital media broadcasting)—also designated as T-DAB (terrestrial digital audio broadcasting) or T-DMB (terrestrial digital media broadcasting), based in particular on ETSI EN 300 401—in the radio frequency bands VHF II (65.9 MHz to 108.0 MHz) and VHF III (174 MHz to 230 MHz, alternatively defined from 174 MHz to 240 MHz).

Transmission systems according to DOCSIS (Data Over Cable Service Interface Specification) standardization are increasingly used for internet connections. There are plans for the newest generation of DOCSIS to expand the internet data transmission in the cable network into the VHF frequency range, and in particular to henceforth allocate the VHF II and III frequency bands, previously used exclusively for broadcast programs, for fast internet data connections. Thus, the introduction of the new DOCSIS technology would make the cable-linked transmission of radio programs impossible in these frequency bands. The radio receivers previously connected to the cable networks would be left with no signal, so that the customers of the cable networks could no longer use their usual devices.

Thus, the underlying object of the present invention consists in facilitating the internet data transmission in the VHF frequency bands II and III (e.g. using DOCSIS 3.1) and simultaneously providing reception to the radio receivers connected to the cable networks.

This problem is solved by a system according to claim 1 and its use according to claim 15, as well as a method according to claim 16. Advantageous embodiments of the invention are the subject matter of the dependent claims.

At its core, the idea underlying the present invention is that the broadcast and radio signals destined for radio receivers connected to the cable network at an original frequency in the VHF range between 30 MHz and 280 MHz, in particular in the range of VHF band II between 65.9 MHz and 108 MHz and/or of VHF band III between 174 MHz and 230 MHz or between 174 MHz and 240 MHz, are to be transferred into another free frequency range of the cable network by means of a frequency band transfer device, are to be transmitted to the cable network in this frequency range, and directly upstream the radio receiver, are to be transferred back into the original frequency receivable by the radio device or into another frequency in the VHF range that is receivable by the radio device by means of a device for lowering the frequency band. To define the other frequency range, preferably a partial range of the VHF range from 30 MHz to 280 MHz is initially defined, in which the original frequency is located, and which has a width of at least 0.3 MHz, preferably by the space for five USW programs, roughly indicated as a width of at least 1.5 MHz, and wherein the partial range is additionally preferably one of the VHF bands defined in the known way, as is indicated in the article from "Wikipedia, the free encyclopedia" regarding the keyword "Frequenzband [frequency band]", accessible on Feb. 21, 2017 at https://de.wikipedia.org/wiki/Frequenzband. The other frequency range is different from the partial range and preferably also does not intersect with the same, either, thus lying outside of the partial range. A predefined range of an original frequency may be defined as a partial range, such as according to a table. Instead of this, it is also possible to determine the partial range according to a specific method based on the original frequency and optionally other original frequencies and optionally additional parameters.

In one variant, the other frequency range may be another partial range in the VHF range: If, for example, the partial range is VHF band III in the definition up to 230 MHz, the other frequency range, into which the frequency is transferred, may already begin at 230 MHz and end, for example, at 280 MHz or thereabove or therebelow. It may also be defined outside of the USW/FM radio frequencies and the DAB band III, thus it is then outside of 30 MHz to 230 MHz. In another variant, the other frequency range lies completely outside of the VHF range, thus below 30 MHz or above 280 MHz. The other frequency range is to be a free transmission frequency range of the cable network. This is determined in this respect by the occupation of the frequency ranges of the cable network by other services. In one advantageous embodiment, a device is provided for detecting a transmission frequency range in the cable network free from transmitted signals, which determines the necessary scope of the transfer and correspondingly controls the devices of the system according to the invention.

The frequency, to which the back transfer occurs, does not differ from the original frequency in one variant; however, it is possible in another variant that it differs from the original frequency, preferably by a difference frequency which is exactly one or more times the grid spacing frequency in the frequency grid of the respective broadcasting service. For example, for ultrashort wave (USW), the grid spacing frequency equals 50 KHz, and the difference frequency may then be n times 50 KHz, where n equals 1 or another suitably small non-negative integer (so that it still lies within the receivable range). In digital audio broadcasting (DAB) or DAB+, the grid spacing frequency is 1.712 MHz or 1.872 MHz according to the block in the channel.

According to the invention, for the purpose of signal transmission in a free transmission frequency range of a cable network, a system is provided for transferring and transferring back at least one VHF (very high frequency) radio signal into or out of the free transmission frequency range, wherein the system has on the one hand at least one frequency band transfer device for arrangement at a cable system headend of the cable network which is designed to transfer at least one radio signal to be transmitted at an original frequency from a partial range in the VHF range between 30 MHz and 280 MHz, in particular in the range of VHF band II between 65.9 MHz and 108 MHz and/or VHF band III between 174 MHz and 240 MHz, for transmitting via the cable network at a transmission frequency into another, predetermined (and free) transmission frequency range of the cable network. On the other hand, the system according to the invention has at least one frequency band back-transfer device which is provided for an arrangement at the input-side of a radio receiver connected to the cable network, in particular for an arrangement between a receiver-side cable network connection and a radio receiver connectable to the cable network via the cable network connection, and is designed to transfer the radio signal transmitted at the transmission frequency back to the original frequency or to another frequency in the VHF range receivable by the connected or connectable radio receiver.

The advantage of the invention consists in that, by using a frequency band transfer device in the cable headend of the cable network (signal preparation control center of the cable systems) and by interposing a frequency band back-transfer device at the receiver-side cable junction box, the connected radio receiver may continue to be provided with reception, while an internet data transmission may now simultaneously take place on the frequencies which the radio receiver previously received directly from the cable network. Thus, the essential advantage arises, in particular for the cable network operators, that they may continue to offer an uncomplicated radio reception using the currently available receiving devices. Otherwise, upon expansion of the internet data transmission into the VHF frequency range, the customers would have to receive radio programs in the future via TV devices, for example, whereby these would have to be switched on without using the image display, which offers neither ease of use nor energy efficiency. Or else the customers would have to exchange their previous devices for new radio receivers, e.g. for so-called DVB-C (Digital Video Broadcasting-Cable) or IP (Internet Protocol) streaming receivers. In addition, the possibility is created for the cable network operators by the arrangement and conception shown here, to offer analog USW radio and DAB or DAB+ for a fee, since only cable network customers with a frequency band back-transfer device for their cable junction boxes are able to receive these signals.

Another advantage arises in that such USW frequencies, which are simultaneously occupied for wireless transmission by strong transmitters in the region, are sometimes not used on many cable networks because these frequencies may beam into the cable network from outside, and thus interfere with a transmission. With the present invention, additional USW frequencies may be occupied by the cable network, insofar as the radio signal transmission takes place on the network in transmission frequency ranges outside of the radio bands. The signal, which is prepared for the radio receiver downstream of the antenna socket outlet, is sufficiently strong, in the case of industry standard shielding, to remain receivable in the receiver without interference.

Naturally, the system according to the invention is designed to transfer not only a radio signal of a single frequency, but instead preferably multiple radio signals of a frequency band, in particular of VHF band II between 65.9 MHz and 108 MHz and/or VHF band III defined between 174 MHz and 230 MHz or defined between 175 MHz and 240 MHz, particularly preferably, a complete frequency band, for example the VHF band II between 65.9 MHz and 108 MHz and/or VHF band III defined between 174 MHz and 230 MHz/240 MHz, into a free transmission frequency range, and after the transmission in the free transmission frequency range, to transfer them back on the receiver side to the original frequency or to another frequency in the VHF range receivable by the connectable or connected radio device. Advantageously, the free transmission frequency range is sought in such a way that all the frequencies of the original frequency range to be transmitted may be accommodated therein. It is, however, also conceivable that a first frequency group of a first frequency sub-band of the VHF frequency band to be transmitted is transferred into a first free transmission frequency range and another frequency group or another frequency sub-band of the VHF frequency band to be transmitted is transferred into another free transmission frequency range. The transmission frequencies or the transmission frequency range should be advantageously selected so that they lie outside of the mobile communications frequencies, as otherwise mobile communication devices in the households may lead to interference with the radio reception during use due to their transmissions. The free, preferably coherent transmission frequency range may also lie inside and/or outside of the VHF range.

In general, it is conceivable that the transmission frequency range lies above or below the original frequency or frequencies to be transferred. If the transmission frequency range lies above the original frequency or frequencies to be transferred, then an advantageous embodiment of the invention provides that the frequency band transfer device has a device for raising the frequency band to raise the at least one radio signal to be transmitted at the original frequency to a higher transmission frequency of a free or of the predetermined transmission frequency range of the cable network, and that the frequency back-transfer device has a device for lowering the frequency band to lower the radio signal transmitted at the higher transmission frequency to the original frequency or another frequency in the VHF range receivable by the radio device. If, in contrast, the transmission frequency range lies below the original frequency or frequencies to be transferred, for example, below the frequency of 50 MHz, in which the transmission begins according to DOCSIS, then another advantageous embodiment of the invention provides that the frequency band transfer device has a device for lowering the frequency band to lower the at least one radio signal to be transmitted at the original frequency or another frequency receivable by the radio receiver to a lower transmission frequency in a free or the predetermined transmission frequency range of the cable network, and the frequency back-transfer device correspondingly has a device for raising the frequency band to raise the radio signal transmitted at the lower transmission frequency to the original frequency or another frequency in the VHF range receivable by the radio receiver.

According to one advantageous embodiment of the invention, the device for raising the frequency band comprises a frequency mixer with a signal input, an oscillator input, and a signal output, a local oscillator operatively connected to the oscillator input to generate a local high frequency signal, and an output band-pass filter operatively connected to the signal output. The frequency mixer is designed to receive a radio signal to be raised via the signal input, to multiplicatively mix it with the high frequency signal received via the oscillator input, and to generate at the output at least one sum signal and preferably also a difference signal corresponding to the sum or difference of the high frequency signal and the radio signal to be raised. Furthermore, the output band-pass filter is designed essentially to output only the sum signal as a raised radio signal. This may be, for example, the radio signal to be transmitted at the transmission frequency via the cable network, in particular a radio signal to be output to a transmission component of the cable headend of the cable network, or conversely the radio signal to be transferred back to the original frequency on the receiver side. Due to the previously listed elements, a particularly simple technical realization of a device for raising the frequency band is provided. The local high frequency signal is thereby selected in such a way that the sum signal, made from the frequency to be raised and the local high frequency signal, lies in the free transmission frequency range in which the signal is to be actually transmitted on the cable network or back in the original frequency range. The output band-pass filter is preferably a broadband band-pass filter which is designed in such a way to filter out a complete frequency range to be transferred or to be transferred back into.

In a similar, but quasi-inverted way, the device for lowering the frequency band according to the previously described advantageous embodiment of the invention may comprise a frequency mixer with a signal input, an oscillator input, and a signal output, a local oscillator operatively connected to the oscillator input to generate a local high frequency signal, and an output band-pass filter operatively connected to the output. Therein, the local high frequency signal of the device for lowering the frequency band and of the device for raising the frequency band are essentially identical frequencies. The frequency mixer of the device for lowering the frequency band is designed to receive a radio signal to be lowered via its signal input, to multiplicatively mix it with the local high frequency signal of the device for lowering the frequency band received via its oscillator input, and to generate at its signal output at least one difference signal and preferably also a sum signal corresponding to the sum or difference made of the local high frequency signal and the radio signal to be lowered. Furthermore, the output band-pass filter of the device for lowering the frequency band is designed essentially to output only the difference signal as a lowered radio signal, for example as the radio signal lowered to the original frequency or the lowered radio signal to be transmitted.

Furthermore, it may be provided according to one advantageous embodiment of the device, that the frequency band transfer device has an input band-pass filter on the input side, in particular upstream of the frequency mixer of the device for raising the frequency band or of the device for lowering the frequency band, said input band-pass filter being designed to output essentially only radio signals from a specific original VHF frequency range, in particular from the VHF band II between 65.9 MHz and 108 MHz and/or the HVF band III between 174 MHz and 230 MHz or 240 MHz. This prevents that other signals present in the cable network are likewise transferred in an undesired way by the frequency band transfer device into the free transmission frequency range. The other frequencies thus only arrive in a damped fashion or not at all at the input side into the frequency band transfer device, in particular at the input of the frequency mixer of the device for raising the frequency band or of the device for lowering the frequency band.

Another advantageous embodiment of the invention analogously provides that the frequency band back-transfer device has an input band-pass filter on the input side, in particular upstream of the frequency mixer of the device for raising the frequency band or of the device for lowering the frequency band, said input band-pass filter being designed to output essentially only radio signals from the free transmission frequency range of the cable network, thus radio signals raised or lowered from the original range of the VHF band II between 65.9 MHz and 108 MHz and/or the HVF band III between 174 MHz and 230 MHz or 240 MHz by, for example, the frequency of the local high frequency signal of the device for raising the frequency band or of the device for lowering the frequency band.

Depending on the situation, it may be further advantageous that the frequency band transfer device has an input amplifier stage for the purpose of amplifying signals on the input side, preferably, if present, upstream or downstream of the input band-pass filter.

Conversely, the signal on the output side or at the output of the frequency band transfer device may potentially be too strong for the feed-in point of the cable network system. Therefore, it may be provided as needed that the frequency band transfer device has an output damping stage on the output side in order to damp radio signals to be fed into the cable network. If the signal is too weak, then the level may conversely be increased by an output amplifier stage, in particular by a broadband output amplifier stage, which the frequency band transfer device has on the output side. It is conceivable, in particular, that the output damping stage or the output amplifier stage of the frequency band transfer device is connected upstream or downstream of the output band-pass filter of the device for raising the frequency band or of the device for lowering the frequency band, depending on the realization of the frequency band transfer device.

Similarly, depending on the situation, the frequency band back-transfer device may have an input amplifier stage for the purpose of amplifying the signal on the input side, preferably, if present, upstream or downstream of the input band-pass filter. Likewise, the signal level may be too high or too low on the output side or at the output of the frequency band back-transfer device. Correspondingly, according to another advantageous embodiment of the invention, the frequency band back-transfer device may have an output damping stage or an output amplifier stage on the output side in order to reduce or to amplify the signal level to the usual or required level for the radio receiver. Depending on the realization of the frequency band back-transfer device, the output damping stage or the output amplifier stage of the frequency band back-transfer device may be connected upstream or downstream of the output band-pass filter of the device for raising the frequency band or of the device for lowering the frequency band.

The local oscillator of the device for raising the frequency band or of the device for lowering the frequency band generates a local frequency signal at a constant frequency. This frequency may be set in a previously fixedly defined system-internal way (thus is not controllable). Alternatively a control or programming of the frequency by means of a programmable controller may be provided. The control of the local oscillator may be realized for example based on a frequency programmed in by means of a phase locked loop (PPL) using a frequency divider and a quartz reference. The local oscillator may also be controlled and synchronized by a carrier signal which is transmitted via the cable network. Since the vast majority of radio receivers tolerate a small frequency deviation, this is necessary only in the case that the local high frequency is to be remotely controlled or that a less expensive production of the devices is thus facilitated for the customers of the cable network. One advantageous embodiment of the invention may therefore provide that the local oscillator of the device for raising the frequency band is controllable by means of a control device, in particular, is locally or remotely controllable by means of a carrier signal transmittable via the cable network; and/or that the local oscillator of the device for lowering the frequency band is controllable by means of a control device, in particular, is locally or remotely controlled by means of a carrier signal transmittable via the cable network. It is preferably provided for this purpose that the control device may itself detect the carrier signal, for example, in a search run.

If the frequency band back-transfer device is to be connected to one single or broadband TV cable connection, then another advantageous embodiment of the invention may provide that the system additionally has a power splitter or signal decoupler arranged between the receiver-side cable network connection and the device for lowering the frequency for decoupling the radio signal transmitted at the raised frequency. By this means, the reception or transmission of other signals transmitted via the cable network is maintained.

The system described here may be realized both using analog technology and also technology based on DSP (digital signal processor) using firmware or also a mixture. Using DSP, for example, filters, mixers, and amplifiers may be realized using software and/or firmware code. Correspondingly, according to another advantageous embodiment of the invention, the frequency band transfer device and/or the frequency band back-transfer device, in particular potentially used devices for lowering the frequency, devices for raising the frequency, preferably possibly used input band-pass filters, output band-pass filters, and/or frequency mixers may be realized at least partially by means of analog electronic components. Alternatively or additionally, it may also be provided that the components listed above or parts thereof may be realized by means of a digital processor in combination with software and/or firmware.

The invention additionally relates to the use of a system according to the invention for the transmission of at least one radio signal having an original frequency in an at least 1.5 MHz wide partial range of the VHF range, which is defined between 30 MHz and 280 MHz, in particular in the range of VHF band II between 65.9 MHz and 108 MHz and/or of VHF band III between 174 MHz and 230 MHz or between 174 MHz and 240 MHz, in a predetermined (thus) free transmission frequency range of a cable network, for transferring the original frequency of the radio signal by means of the frequency band transfer device of the system according to the invention to a transmission frequency in a predetermined (thus free) transmission frequency range, and for transferring the radio signal transmitted via the cable network at the transmission frequency back to the original frequency or to another frequency receivable by the connected radio receiver by means of the frequency band back-transfer device of the system according to the invention upstream of a radio receiver connected to the cable network.

An independent concept additionally relates to a method for the transmission of at least one VHF (very high frequency) radio signal in a free (and correspondingly predetermined) transmission frequency range of a cable network, wherein the method has:
  transferring of at least one radio signal, to be transmitted at an original frequency in an at least 20 MHz wide partial range of the VHF range between 30 MHz and 280 MHz, in particular in the range of VHF band II between 65.9 MHz and 108 MHz and/or of VHF band III defined between 174 MHz and 230 MHz or defined between 174 MHz and 240 MHz, to a transmission frequency in the predetermined transmission frequency range of a cable network by means of a frequency band transfer device;
  transmitting the radial signal at the transmission frequency in the predetermined transmission frequency range via the cable network; and
  transferring the radio signal transmitted via the cable network at the transmission frequency back to the original frequency or to another frequency receivable by the connected radio receiver by means of a frequency band back-transfer device at the input side upstream of a radio receiver connected to the cable network.

The method according to the invention may be preferably carried using the system according to the invention disclosed here.

A step of detecting the predetermined transmission frequency range, which is detected as a range which is free of other signals to be transmitted, may precede the described method.

Additional details of the invention and in particular an exemplary embodiment of the proposed system for transferring and transferring back from transmission frequencies are subsequently explained in greater detail by way of the appended drawings.

Figure 2:
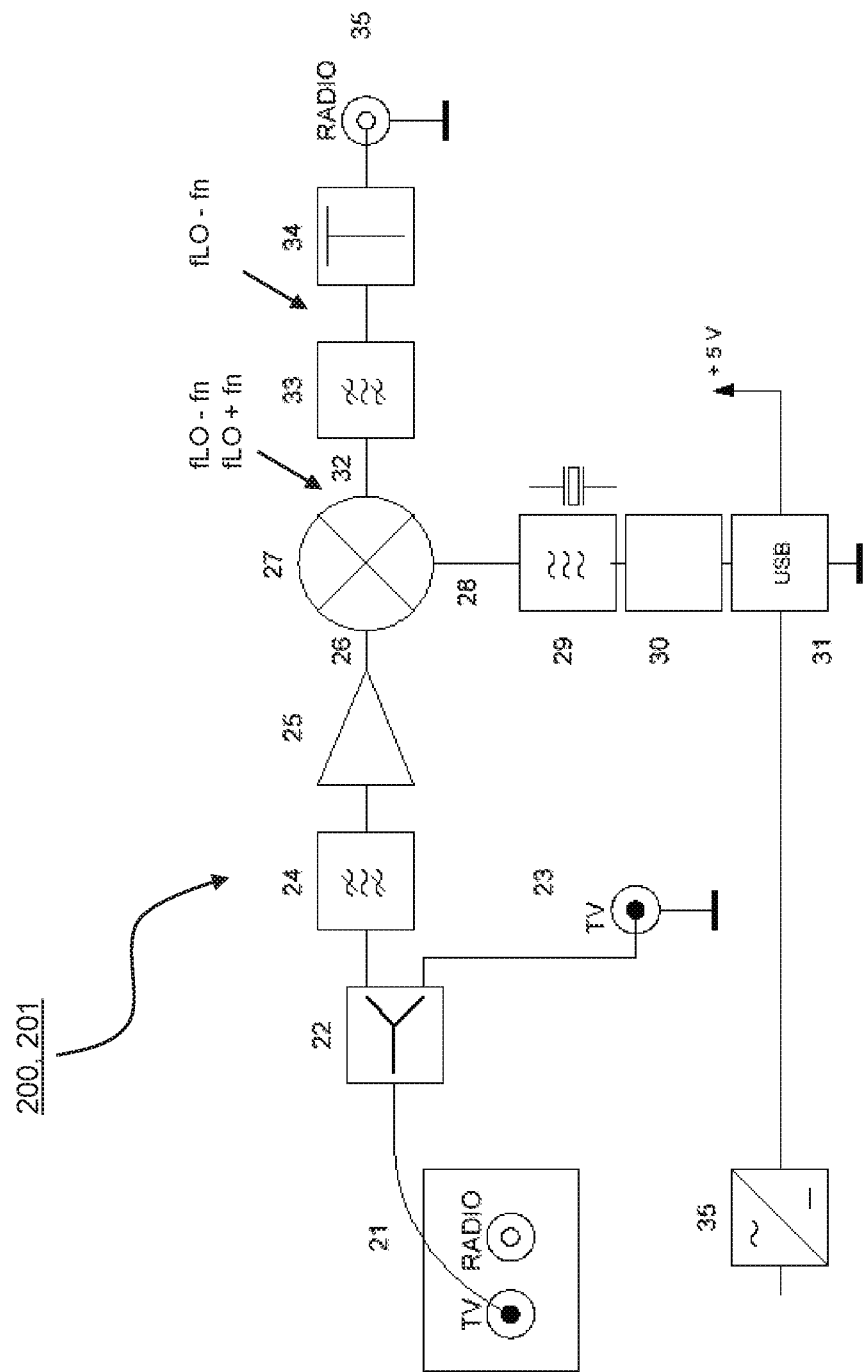

FIG. 1 shows a possible exemplary embodiment of a frequency band transfer device according to the system according to the invention; and FIG. 2 shows a possible exemplary embodiment of a frequency band back-transfer device according to the system according to the invention.

The presently described exemplary embodiment of a system according to the invention for transferring and transferring back at least one VHF radio signal into or out of a free transmission frequency range of a cable network may be used both for USW (VHF band II) and also for DAB/DAB+/DMB (VHF band III). The same methods are used for this, however, the components are configured separately tor the transferring and transferring back using respectively adjusted frequency ranges and are advantageously manufactured separately.

FIG. 1 shows a possible exemplary embodiment of a frequency band transfer device 100 according to the system according to the invention, which presently essentially has a device 101 for raising the frequency band or is essentially realized as a device 101 for raising the frequency band. Device 101 for raising the frequency band may have multiple inputs 1 at which all USW or DAB carrier signals at similar high-frequency levels to be transmitted may be applied. USW radio programs are transmitted via country-specific frequencies, usually at VHF band II, while the carrier signals of DAB ensembles are usually located in band III, wherein, depending on the country, the so-called VHF channel 13 or the so-called L-band may be included. China and South Korea have channel spacings that deviate from Europe. However, the frequency ranges relevant for the cable networks are all located in and around VHF band III.

Downstream of inputs 1, device 101 for raising the frequency band has an input band-pass filter 2, which only permits USW signals or DAB/DAB+/DMB signals to pass through in the present exemplary embodiment. The other frequencies arrive at input 4 of a frequency mixer 5 only in a damped way or not at all. Frequency mixer 5 comprises two inputs: a signal input 4 for the desired signal and an oscillator input 6 for a local oscillator 7. Local oscillator 7 generates a local high frequency signal at a constant frequency. The frequency may be fixedly defined or predetermined. Alternatively, as in the present exemplary embodiment, a control 8 or a programming of the frequency may be provided, which is typically carried out prior to delivery by means of a programmable controller 8. Control 8 of local oscillator 7 may be carried out, for example, based on a frequency programmed in by means of a phase locked loop (PPL) with a frequency divider and a quartz reference. Local oscillator 7 may also alternatively be controlled and synchronized by a carrier signal, which is transmitted via the cable network. Since the vast majority of radio receivers tolerate a small frequency deviation, this is necessary only if the local high frequency is e.g. remotely controlled or if a less expensive production of the devices at the customers of the cable network is to be facilitated.

Radio signal fn to be transmitted is applied at signal input 4 and local high frequency signal fLO is applied at oscillator input 6 at frequency mixer 5. Frequency mixer 5 generates difference signal fLO−fn and the sum signal fLO+fn, among others, which are also designated as IF signals (intermediate frequencies) at signal output 9.

For the transmission in the free transmission frequency range, only the sum of frequencies fLO+fn, i.e. the sum of the high frequency signal of the local oscillator and the radio signal to be transmitted, is to be used, which is filtered for this purpose using band-pass filter 10.

If the signal is too strong for the feed-in point of the cable system, then it may be damped, as needed—as in the present exemplary embodiment—by means of an output damping stage 11. If, conversely, the signal is too weak, then the level may be increased, for example, by a broadband amplifier connected downstream. The raised radio signal with transmission frequency fLO+fn provided for the transmission at output 12 of device 101 for raising the frequency band is available for feeding into the cable network.

Furthermore, it is to be advantageously considered during the design of the system that the signals at inputs 1, input band-pass filter 2, input amplifier stage 3, and at signal input 4 of frequency mixer 5 virtually no longer appear at output 12 of device 101 for raising the frequency band. Advantageously, the damping is at least 60 dB, as otherwise the planned expanded internet data transmission via DOCSIS may be negatively affected.

A supply 13 may be provided for the energy supply of device 101 for raising the frequency band, said supply being supplied with energy, as needed, e.g., by the electrical network with or without redundancy.

A frequency example will be subsequently briefly discussed. In an exemplary cable system, in which the present invention may be used, the frequency range between 260 MHz and 420 MHz is still free and is to be used as a transmission frequency range in the meaning of the present invention. The local high frequency signal may accordingly be set to 200 MHz. The USW program palette or the VHF band II between 65.9 MHz and 108 MHz may thus be transmitted via the cable network in the free transmission frequency range between 265.9 MHz and 308 MHz. Above 308 MHz, e.g., additional USW program palettes or one or more DAB ensembles from VHF band III (174 MHz-240 MHz) may be transmitted. For example, VHF band III may hereby be transmitted between 324 and 390 MHz using a second device for raising the frequency which has a local high frequency of 150 MHz. In each case, it should be considered that the sum of the lowest frequency of the frequency band to be transmitted and the bandwidth of the frequency band to be transmitted is smaller than the local high frequency signal. As the quality of the required filter also depends on the frequency intervals and the constellation of the mixer products, the local high frequency signal is to be selected so that the manufacturing remains inexpensive.

According to the method according to the invention, the one or more radio signals to be raised are then transmitted in the free transmission frequency range via the cable network and made available on the receiver side at cable connections.

The radio signal to be transmitted in the free transmission frequency range is then supplied according to the invention by the cable network via a receiver-side cable connection to a frequency band back-transfer device 200 according to the invention.

FIG. 2 shows a possible exemplary embodiment of such a frequency band back-transfer device 200, which presently essentially has a device 201 for lowering the frequency band or is essentially realized as a device 201 for lowering the frequency band. Diverse cable junction boxes may be provided on the receiver side, which each generally have a TV and a radio connection. Depending on the model of the cable junction box, the radio connection transmits the entire frequency band or, however, primarily only VHF band II. Because the transmission of the radio program is carried out according to the invention outside of the VHF bands II and III, the radio connection would sometimes not be suitable for this. Therefore, it is provided in the present exemplary embodiment of frequency band back-transfer device 200 or of device 201 for lowering the frequency band—as shown in FIG. 2—that a broadband TV connection is used. By using one single or broadband TV connection, the following operation arises: an output divider or signal decoupler 22 forwards—preferably a larger part—of the cable signal received from the cable network to a TV connection 23, to which a TV device may be connected—instead of directly to the cable junction box as previously. Thus, the TV reception remains possible as previously.

The other part of the cable signal arrives at an input band-pass filter 24, which permits signals from the free transmission frequency range to pass through and guides them to input 26 of a frequency mixer 27 of device 201 for lowering the frequency band. The remaining frequencies are suppressed to the extent that no interference of the radio reception occurs. Depending on the transmission frequency range selected, the remaining frequency occupation on the cable network and other influences, an input band-pass filter 24 having a higher or lesser quality factor may be necessary. The selection of the transmission frequency range and the intervals to adjacent frequencies on the cable networks are to be advantageously selected in such a way that an inexpensive manufacturing of input band-pass filter 24 with low spatial requirements is possible. An interference affectation of the TV reception or on the operation of the cable network may be virtually excluded. If junction boxes are used in a cable network, which also sufficiently transmit the transmission frequency range to the radio connection, then the output divider or signal decoupler 22 and TV connection 23 may be omitted. Input band-pass filter 24 may then be connected directly to the radio junction box.

Frequency mixer 27 of device 201 for lowering the frequency band has—analogous to frequency mixer 5 of device 101 for raising the frequency band—two inputs: a signal input 26 for the desired signal and an oscillator input 28 for a local oscillator 29 which generates a local high frequency signal at a constant frequency. The frequency of the local high frequency signal of device 201 for lowering the frequency band has to be essentially identical to that of local oscillator 7 of device 101 for raising the frequency band. Analogously, this is either fixedly defined and local oscillator 7 of the device for lowering the frequency range is correspondingly configured, or a control or programming is carried out of the frequency of the local high frequency signal of device 201 for lowering the frequency band. In the present exemplary embodiment, a controller 30 is provided, which may be carried out, for example, based on a frequency programmed in by means of a phase locked loop with a frequency divider and quartz reference. The programming of the frequency may be carried out, e.g. fixed directly during the manufacturing or, as in the present exemplary embodiment, e.g. via a USB interface 31. Alternatively, controller 30 may be variable in frequency and may be able to detect the frequency range during a search function based on a high frequency marking carrier in the radio signals. Device 201 for lowering the frequency band may also simultaneously be supplied with energy in an advantageous way via the USB connection. Local oscillator may also be controlled and synchronized by a carrier signal which is transmitted via the cable network (not shown). Since the vast majority of radio receivers tolerate a small frequency deviation, this is necessary only if the local high frequency is to be, e.g., remotely controlled or to realize a less expensive production of device 201 for lowering the frequency band.

Desired signal fn is applied at signal input 26 and local high frequency signal fLO of local oscillator 29 is applied at signal input 28 at frequency mixer 27. At signal output 32, frequency mixer 27 of device 201 for lowering the frequency band generates, among others, intermediate frequencies fLO−fn and fLO+fn. For the lowering or back transferring, only the difference of the frequencies fLO−fn is used, and is filtered out for this purpose with the aid of an output band-pass filter 22. As the radio receivers are generally not disturbed by the presence of signals with frequencies outside of their bandwidth, the quality factor of output band-pass filter 33 is significantly less critical than the quality factor of input band-pass filter 24.

If the signal level at the output of output band-pass filter 33 is too high, then it may be reduced as needed using an output damping stage 34 to the level common for the radio receiver.

During the design of frequency band back-transfer device 200 or device 201 for lowering the frequency band, it is to be additionally taken into consideration that the signals at junction box 21, output divider 22, TV connection 24, input band-pass filter 24, input amplifier stage 26 and at input 26 of frequency mixer 27 virtually no longer appear at output 35 of device 201 for lowering the frequency band. Advantageously, the damping is at least 60 dB in both directions, as otherwise the desired signal (radio reception) or also the DOCSIS signals may be negatively affected.

As already previously mentioned, a USB connection 31 may be used for supplying frequency band back-transfer device 200 or device 201 for lowering the frequency band, a USB socket network device 35 may advantageously be provided for the energy supply of said USB connection. The power consumption of device 201 for lowering the frequency band proposed here is very small, so that the USB voltage of 5 V is sufficient.

All desired signals at the frequency range (USW: band II, DAB/DAB+/DMB: band III) envisaged for the radio receiver are provided again to the radio receiver according to the present invention, which is connectable to a connection or output 35 of frequency band back-transfer device 200 or device 201 for lowering the frequency band.

For simultaneous transmission of USW and DAB/DAB+/DMB, multiple systems according to the invention may be used. In the cable headend of the cable network, the corresponding frequency band transfer devices, thus for example devices for raising the frequency band, are arranged in parallel. For cable network customers, the corresponding frequency band back-transfer devices, thus, for example, devices for lowering the frequency band, are connected in series.

It may be helpful for the user of the system to also connect the output of frequency band back-transfer device 200 to the cable network, in order to receive the radio programs everywhere in the household. Optionally, to prevent erroneous coupling into the cable network occurring thereby, it may be checked by a circuit in the frequency band back-transfer device how strong a signal is that arrives from the output into frequency band back-transfer device 200, and which switches the device off if the signal strength exceeds a threshold value. Alternatively, the signal strength at the output may be monitored in relation to the signal strength at the input and a threshold value for switching off may be related to a corresponding ratio size.

The invention claimed is:

1. A system for transmitting radio signals on cable networks by transferring and transferring back at least one very high frequency (VHF) radio signal into or out of a predetermined transmission frequency range of a cable network for transmitting the VHF radio signal in this predetermined transmission frequency range via the cable network, wherein the system comprises:
   at least one frequency band transfer device which is designed for arrangement upstream of a transmission module of a cable headend of the cable network, wherein the frequency band transfer device is designed to transfer at least one radio signal to be transmitted which has an original frequency in an at least 1.5 MHz wide partial range of a VHF range between 30 MHz and 280 MHz, to a transmission frequency in the predetermined transmission frequency range of the cable network for transmission via the cable network, wherein the predetermined transmission frequency range of the cable network is a different range than the partial range in which the original frequency lies;
   at least one frequency band back-transfer device (200) which is designed for an input-side arrangement on a radio receiver connectable to the cable network, namely between a receiver-side cable network connection and a radio receiver connectable to the cable network via the receiver-side cable network connection, wherein the frequency band back-transfer device is designed to transfer the radio signal transmitted at the transmission frequency back to a frequency in the VHF range receivable by a connectable radio receiver.

2. The system as claimed in claim 1, wherein the partial range is a) a VHF band II between 65.9 MHz and 108 MHz and/or b) a VHF band III defined between 174 MHz and 230 MHz or a VHF band defined between 174 MHz and 240 MHz, and the predetermined transmission frequency range is a range outside of the partial range, so that the original frequency lies outside of the predetermined transmission frequency range.

3. The system as claimed in claim 1, wherein the frequency band back-transfer device is designed to transfer the radio signal transmitted at the transmission frequency back to the original frequency in the VHF range.

4. The system as claimed in claim 1, wherein the frequency band transfer device has a device for raising a frequency band to raise at least one radio signal to be transmitted which has the original frequency to a higher transmission frequency in the transmission frequency range of the cable network, and the frequency band back-transfer device has a device for lowering a frequency band to lower the radio signal transmitted at the higher transmission frequency to a frequency receivable by a connectable radio receiver and preferably the original frequency in the VHF range; or the frequency band transfer device has a device for lowering the frequency band to lower the at least one radio signal to be transmitted which has the original frequency to a lower transmission frequency in the transmission frequency range of the cable network, and the frequency band back-transfer device has a device for raising the frequency band to raise the radio signal transmitted at the lower transmission frequency to the frequency receivable by a connectable radio receiver and preferably the original frequency in the VHF range.

5. The system as claimed in claim 4, wherein the device for raising the frequency band comprises a frequency mixer with a signal input, an oscillator input, and a signal output, a local oscillator operatively connected to the oscillator input for generating a local high frequency signal, and an output band-pass filter operatively connected to the signal output, wherein the frequency mixer is designed to receive a radio signal to be raised via the signal input, to multiplicatively mix it with the high frequency signal of the device for raising the frequency band received via the oscillator input, and to generate at the signal output at least one sum signal and preferably one difference signal corresponding to the sum or difference of the high frequency signal and the radio signal to be raised, and wherein the output band-pass filter is designed to only output the sum signal as a raised radio signal, and wherein the device for lowering the frequency band comprises a frequency mixer with a signal input an oscillator input, and a signal output, a local oscillator (29) operatively connected to the oscillator input for generating a local high frequency signal, and an output band-pass filter operatively connected to the output, wherein the local high frequency signal of the device for lowering the frequency band and of the device for raising the frequency band have identical frequencies or are shifted in the frequency grid of an assigned broadcasting service, wherein the frequency mixer of the device for lowering the frequency band is designed to receive a radio signal to be lowered via its signal input(26), to multiplicatively mix it with the high frequency signal of the device for lowering the frequency band received via its oscillator input, and to generate at its signal output at least one difference signal and preferably one sum signal corresponding to the sum or difference of the local high frequency signal and the radio signal to be lowered, and wherein the output band-pass filter of the device for lowering the frequency band is designed to only output the difference signal as the lowered radio signal.

6. The system as claimed in claim 5, wherein the local oscillator of the device for raising the frequency band is controllable by means of a control device and/or the local oscillator of the device for lowering the frequency band is controllable by means of a control device.

7. The system as claimed in claim 6, wherein the local oscillator of the device for raising the frequency band is locally or remotely controllable by means of a carrier signal transmittable via the cable network and/or the local oscillator of the device for lowering the frequency band is locally or remotely controllable by means of a carrier signal transmittable via the cable network, wherein the control device is designed to detect the carrier signal by a search run.

8. The system as claimed in claim 5, the local oscillator operates at a fixedly adjusted frequency.

9. The system as claimed in claim 1, wherein the frequency band transfer device has an input band-pass filter on an input side which is designed to only output radio signals from the partial range.

10. The system as claimed in claim 1, wherein the frequency band back-transfer device has an input band-pass filter on an input side which is designed to output only or at least primarily radio signals from the predetermined transmission frequency range of the cable network.

11. The system as claimed in claim 1, wherein the frequency band transfer device has an output damping stage or an output amplifier stage on an output side and/or the frequency band back-transfer device has an output damping stage or an output amplifier stage on the output side.

12. The system as claimed in claim 1, wherein the frequency band transfer device has an input amplifier stage on an input side and/or the frequency band back-transfer device has an input amplifier stage on the input side.

13. The system as claimed in claim 1, wherein the system additionally has a power splitter or signal decoupler arranged between a receiver-side cable network connection and the frequency band back-transfer device for decoupling the radio signal transmitted at the transmission frequency and preferably for receiving and/or transmitting other signals to be transmitted via the cable network.

14. The system as claimed in claim 1, wherein the frequency band transfer device and/or the frequency band back-transfer device is/are realized at least partially by means of analog electronic components and/or by means of a digital processor in combination with software and/or firmware.

15. A method for transmitting radio signals on cable networks by transmitting at least one very high frequency (VHF) radio signal via a cable network in a predetermined transmission frequency range of the cable network, while using a system as claimed in claim 1, wherein the method comprises the following steps:
transferring of at least one radio signal, to be transmitted at an original frequency in an at least 1.5 MHz wide partial range of a VHF range between 30 MHz and 280 MHz, in particular in a range of VHF band II between 65.9 MHz and 108 MHz and/or of a VHF band III defined between 174 MHz and 230 MHz or defined between 174 MHz and 240 MHz, to a transmission frequency in a predetermined transmission frequency range of a cable network by means of a frequency band transfer device;
transmitting the radio signal at the transmission frequency in the predetermined transmission frequency range via the cable network; and
transferring the radio signal, transmitted via the cable network at the transmission frequency, back to a frequency receivable by the connected radio receiver by means of a frequency band back-transfer device at an input side upstream of a radio receiver connected to the cable network.

16. The method as claimed in claim 15, wherein the predetermined transmission frequency range of the cable network is initially detected as a range that is free of other signals to be transmitted.

17. The method as claimed in claim 15, wherein transfer back is carried out back to the original frequency.

* * * * *